(12) United States Patent
Ebina (10) Patent No.: US 10,086,753 B2
(45) Date of Patent: Oct. 2, 2018

(54) VEHICLE INFORMATION PRESENTING DEVICE

(71) Applicant: Nissan Motor Co., Ltd., Yokohama-Shi, Kanagawa (JP)

(72) Inventor: Akihiko Ebina, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/128,598

(22) PCT Filed: Mar. 26, 2014

(86) PCT No.: PCT/JP2014/058481
§ 371 (c)(1),
(2) Date: Sep. 23, 2016

(87) PCT Pub. No.: WO2015/145605
PCT Pub. Date: Oct. 1, 2015

(65) Prior Publication Data
US 2017/0106786 A1    Apr. 20, 2017

(51) Int. Cl.
*B60Q 3/283* (2017.01)
*B60Q 3/80* (2017.01)
(Continued)

(52) U.S. Cl.
CPC ............... *B60Q 3/80* (2017.02); *B60Q 3/283* (2017.02); *B60Q 3/40* (2017.02); *B60Q 3/70* (2017.02);
(Continued)

(58) Field of Classification Search
CPC ... B60Q 3/80; B60Q 3/40; B60Q 3/70; B60Q 3/283; B62D 1/06; B62D 15/029;
(Continued)

(56) References Cited

U.S. PATENT DOCUMENTS 5,666,102 A * 9/1997 Lahiff ...................... B60Q 3/14
340/438
6,226,570 B1 * 5/2001 Hahn ..................... B60K 28/066
701/1
(Continued)

FOREIGN PATENT DOCUMENTS

CN     201998981 U    10/2011
JP     10-194150 A    7/1998
(Continued)

*Primary Examiner* — Nay Tun
(74) *Attorney, Agent, or Firm* — Young Basile Hanlon & MacFarlane, P.C.

(57) ABSTRACT

A vehicle information presenting device used for an automated driving vehicle that automatically performs traveling control of the vehicle based on a traveling state of the vehicle and information on an outside of the vehicle includes: a steering wheel; a light-emitting unit that is disposed in the steering wheel and emits light; and a light-emitting control unit that causes the light-emitting unit to emit light, wherein the light-emitting control unit changes a light-emitting state of the light-emitting unit to induce a driver to switch from automated driving to manual driving in accordance with a system state of the automated driving.

6 Claims, 7 Drawing Sheets

(51) Int. Cl.
*B62D 1/28* (2006.01)
*B62D 15/02* (2006.01)
*B60Q 3/40* (2017.01)
*B60Q 3/70* (2017.01)
*B62D 1/06* (2006.01)
*G08B 5/36* (2006.01)
*H05B 33/08* (2006.01)
*H05B 37/02* (2006.01)
*G05D 1/02* (2006.01)

(52) U.S. Cl.
CPC ............... *B62D 1/06* (2013.01); *B62D 1/28* (2013.01); *B62D 15/029* (2013.01); *G08B 5/36* (2013.01); *H05B 33/0845* (2013.01); *H05B 37/0227* (2013.01); *G05D 1/021* (2013.01)

(58) Field of Classification Search
CPC .. G08B 5/36; H05B 33/0845; H05B 37/0227; G05D 1/021
See application file for complete search history.

(56) References Cited

U.S. PATENT DOCUMENTS

| | | | |
|---|---|---|---|
| 8,260,482 B1 * | 9/2012 | Szybalski | B62D 1/286 701/23 |
| 9,308,857 B2 * | 4/2016 | Lisseman | B60Q 3/024 |
| 2004/0163296 A1 * | 8/2004 | Cronan | G09F 3/10 40/638 |
| 2006/0070795 A1 * | 4/2006 | Meissner | B60K 37/06 180/446 |
| 2008/0211651 A1 * | 9/2008 | Beutnagel-Buchner | B62D 1/046 340/459 |
| 2010/0295670 A1 | 11/2010 | Sato et al. | |
| 2011/0187518 A1 * | 8/2011 | Strumolo | B62D 1/046 340/438 |
| 2014/0111324 A1 * | 4/2014 | Lisseman | B62D 1/046 340/435 |
| 2014/0151356 A1 | 6/2014 | Maguire et al. | |
| 2014/0244115 A1 * | 8/2014 | Sanma | B62D 15/029 701/42 |

FOREIGN PATENT DOCUMENTS

| | | |
|---|---|---|
| JP | 11-091397 A | 4/1999 |
| JP | 2001-199295 A | 7/2001 |
| JP | 2006-521954 A | 9/2006 |
| JP | 2007-199939 A | 8/2007 |
| JP | 2008-195375 A | 8/2008 |
| JP | 2012-035682 A | 2/2012 |
| JP | 2012-256273 A | 12/2012 |
| JP | 2014-004984 A | 1/2014 |

* cited by examiner

VEHICLE INFORMATION PRESENTING DEVICE

TECHNICAL FIELD

The present invention is related to a vehicle information presenting device.

BACKGROUND

A traveling state presenting device is conventionally known for inducing a driver to be prepared and poised in advance before the traveling mode is switched from an automated driving mode to a manual driving mode Japanese Patent Application Publication No. 2001-199295. According to Japanese Patent Application Publication No. 2001-199295, the traveling state presenting device notifies the driver of stability of the automated driving by changing a tilt or an area of a steering wheel image displayed on a monitor in accordance with the stability of the automated driving.

In Japanese Patent Application Publication No. 2001-199295, however, the traveling state presenting device only notifies a driver of stability of automated driving and cannot notify the driver of an action to take.

SUMMARY

In consideration of the above-mentioned problem, an object of the invention is to provide a vehicle information presenting device that is capable of notifying a driver of the action to take in accordance with a system state of the automated driving.

The vehicle information presenting device according to an embodiment of the present invention changes a light-emitting state of a light-emitting unit installed inside of a steering wheel to induce the driver to switch from the automated driving to a manual driving in accordance with a system state of the automated driving.

DETAILED DESCRIPTION OF THE EMBODIMENTS

An embodiment of the present invention is described below with reference to the drawings.

Figure 1:
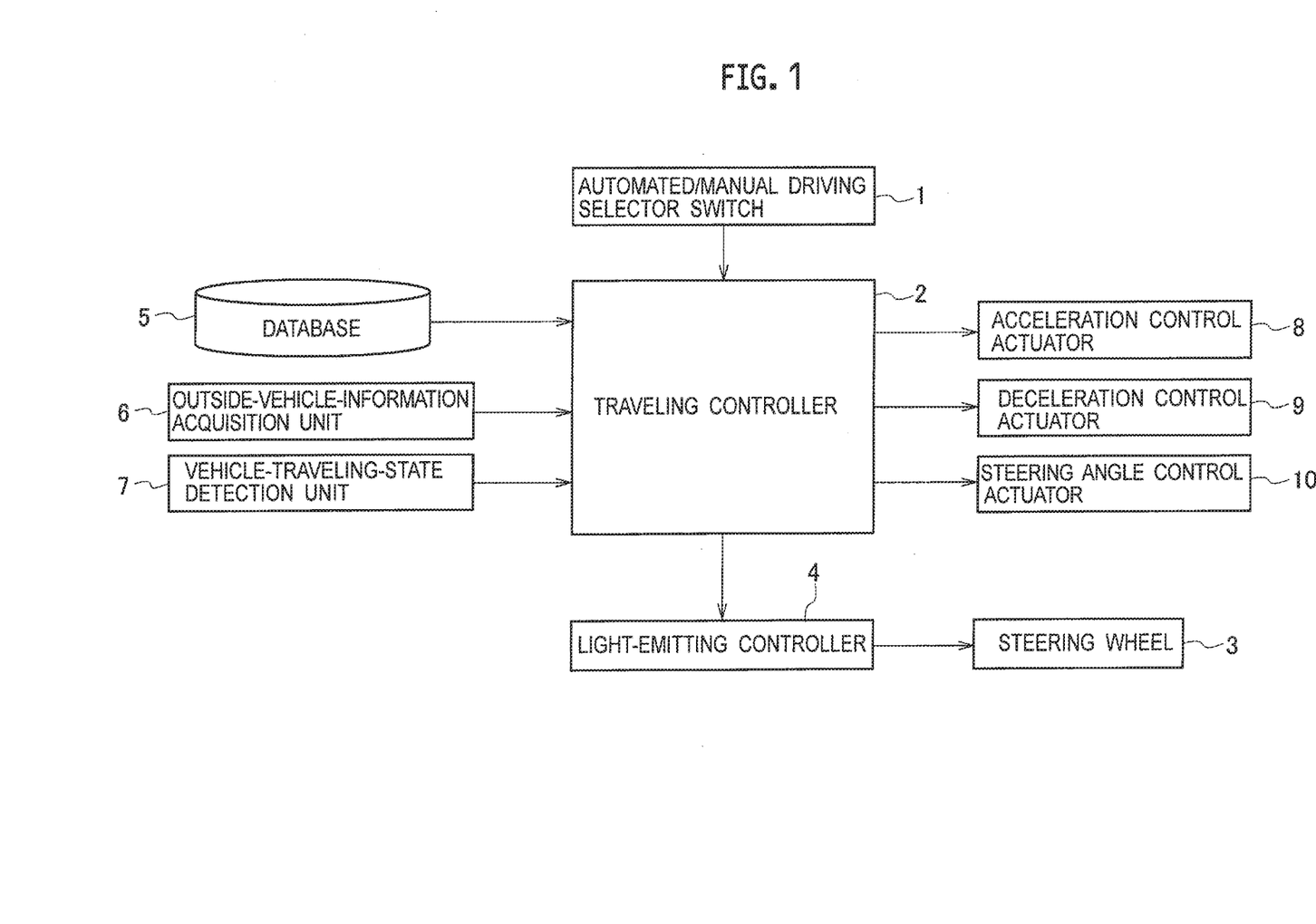
FIG. 1 is a block diagram showing a configuration of an automated driving vehicle that uses a vehicle information presenting device according to an embodiment of the present invention.

As shown in FIG. 1, an automated driving vehicle (hereinafter, simply referred to as a vehicle) is mainly provided with an automated/manual driving selector switch 1, a traveling controller 2, a steering wheel 3, and a light-emitting controller 4.

The automated/manual driving selector switch 1 is to switch between automated driving and manual driving of the vehicle in accordance with a selection of a driver. For example, the automated/manual driving selector switch 1 is arranged in the vicinity of a driving sheet of the vehicle.

The traveling controller 2 is configured as an integrated computer provided with CPU, RAM, ROM, and a storage unit such as a hard disk drive. When the driver selects an automated driving by using the automated/manual driving selector switch 1, the traveling controller 2 automatically controls traveling of the vehicle based on a vehicle traveling state and information on the outside of the vehicle. Specifically, the traveling controller 2 acquires the information on the outside of the vehicle by using a database 5 including a map and traffic information, and an outside-vehicle-information acquisition unit 6 (a camera and a radar sensor, for example). In addition, the traveling controller 2 detects the traveling state of the vehicle by using a vehicle-traveling-state detection unit 7 (for example, a vehicle speed sensor). Then, the traveling controller 2 determines a traveling route to a destination based on the information in the database 5. To cause the vehicle to travel along the determined traveling route, the traveling controller 2 controls drive of various control actuators 8, 9, and 10 based on the information on the outside of the vehicle and the traveling state of the vehicle. Thus, the automated driving of the vehicle is performed by the traveling controller 2.

As described later, LEDs 11 are embedded inside of the steering wheel 3.

The light-emitting controller 4 is configured as an integrated computer provided with CPU, RAM, ROM, and a storage unit such as a hard disk drive. The light-emitting controller 4 calculates a system state of the automated driving and causes the after-mentioned LEDs 11 to emit light based on the calculated system state.

Figure 2:
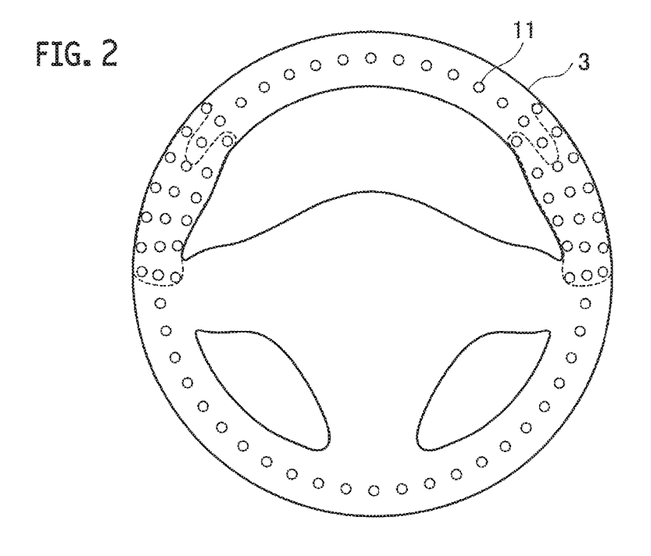
FIG. 2 is a schematic diagram of the vehicle information presenting device.

Next, with reference to FIG. 2, a light-emitting method of the vehicle information presenting device is described. As shown in FIG. 2, the multiple LEDs 11 (light emitting elements) are disposed in the wheel portion of the steering wheel 3. The light-emitting controller 4 causes the LEDs 11 to emit the light based on the system state of the automated driving. The LEDs 11 may be densely arranged on gripping positions of the steering wheel 3 that the driver grasps. The gripping positions of the steering wheel 3 are standard positions on right and left and indicated by dotted lines in FIG. 2; in other words, positions between ten ten and nine fifteen of a clock. By densely arranging the LEDs 11 as shown in FIG. 2, the gripping positions may be caused to emit light in shapes of hands. Here, the light-emitting elements are not limited to the LEDs, but organic ELs may be used.

Figure 3:
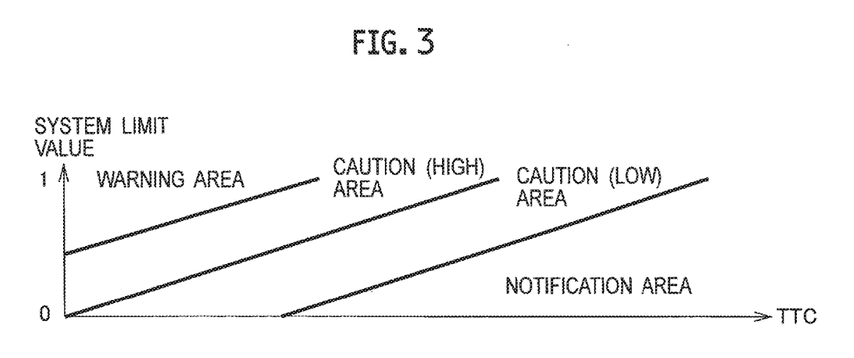
FIG. 3 is a graph describing a system state of automated driving.

Next, with reference to FIG. 3, the system state of the automated driving is described. As shown in FIG. 3, the system state of the automated driving is categorized in four areas based on a TTC (Time to Collision) of a horizontal axis of a graph and a system limit value of a vertical axis of the graph. The four areas are a warning area, a caution (high) area, a caution (low) area, and a notification area. The TTC is the remaining time before the vehicle collides with an obstacle located ahead of the vehicle and is detected by the outside-vehicle-information acquisition unit 6. The system limit value is expressed in an equation below:

The system limit value=a system load×future maximum lateral G.

The system load is, for example, a CPU load rate of the traveling controller 2 and expressed as a number from 0 to 1 in accordance with the load. The future maximum lateral G is expressed as a numerical value from 0 to 1 obtained by normalizing the maximum lateral acceleration degree that will be detected during a curb of future traveling. The traveling controller 2 is able to calculate the future maximum lateral G in advance by using the information in the database 5. Specifically, the load on the vehicle and occupants becomes larger as the system limit value becomes closer to 1. In other words, it means that it is better to switch from the automated driving to the manual driving as the system limit value becomes closer to 1. Here, the system limit value may be obtained based on distance to a place (such as a highway exit or a parking area) where the automated driving is set to be changed to the manual driving. In this case, the system limit value becomes closer to 1 as the distance to the place where the automated driving is set to be changed to the manual driving becomes shorter. In addition, the time to collision to the obstacle located ahead of the vehicle means that it is better to switch from the automated driving to the manual driving as the time to collision becomes shorter.

Next, the four areas are described. The warning area is an area of a short time to collision to the obstacle located ahead of the vehicle and a high system limit value. In other words, the warning area is the area for warning the driver most strongly among the four areas; specifically, the area for urging the driver to switch from the automated driving to the manual driving. In addition, the system state of the automated driving of the warning area is the most unstable among the four areas.

For the caution (high) area, comparing with the warning area, the time to collision to the obstacle ahead of the vehicle is longer, the system limit value is smaller, and it is the area for calling the driver's attention next to the warning area. Specifically, the caution (high) area is the area for inducing the driver to be prepared and poised to perform the manual driving. In addition, the system state of the automated driving of the caution (high) area is unstable after the warning area.

For the caution (low) area, comparing with the caution (high) area, the time to collision to the obstacle ahead of the vehicle is longer, the system limit value is smaller, and it is the area for calling the driver's attention next to the caution (high) area. Specifically, the caution (low) area is, as similar to the caution (high) area, the area for inducing the driver to be prepared and poised to perform the manual driving. In addition, the system state of the automated driving of the caution (low) area is unstable after the caution (high) area.

For the notification area, comparing with the caution (low) area, the time to collision to the obstacle ahead of the vehicle is longer, and the system limit value is smaller. Comparing with the other three areas, the system state of the automated driving of the notification area is the most stable. Therefore, the notification area only requires notifying the driver that the system state of the automated driving is stable.

As described above, the system state of the automated driving changes from the notification area to the caution (low) area, the caution (high) area, and the warning area as the system state of the automated driving becomes more unstable.

In the present embodiment, each of the four areas causes different LEDs 11 to emit light. Examples of the light-emitting of the LEDs 11 for the four areas are described in detail with reference to FIGS. 4A-4D.

Figure 4A:
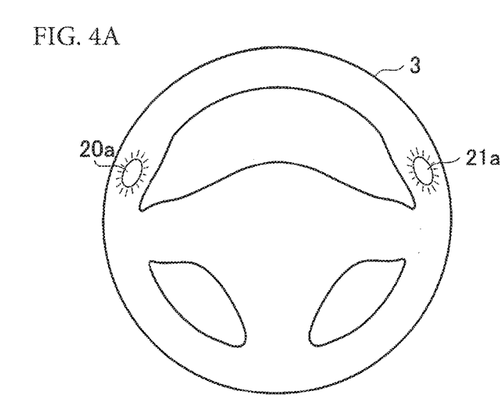
FIGS. 4A-4D are diagrams describing an example of a light-emitting method of the vehicle information presenting device.
Figure 4B:
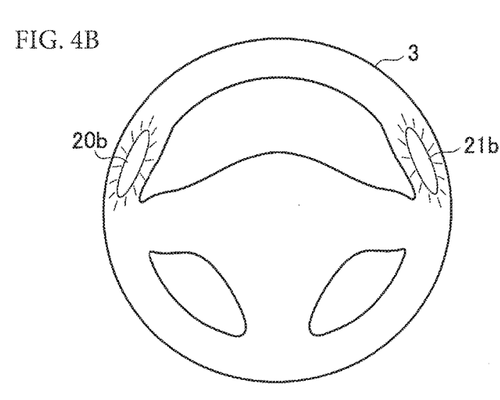
Figure 4C:
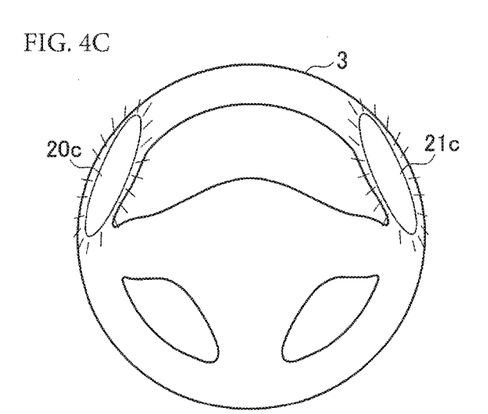
Figure 4D:
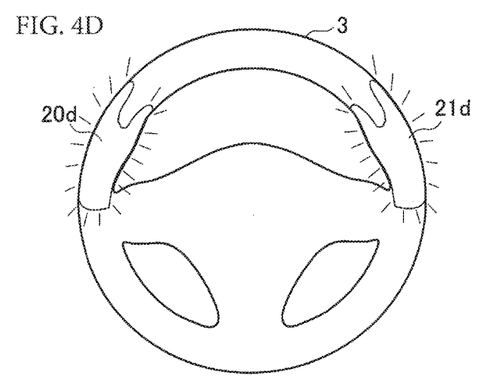
Figure 5A:
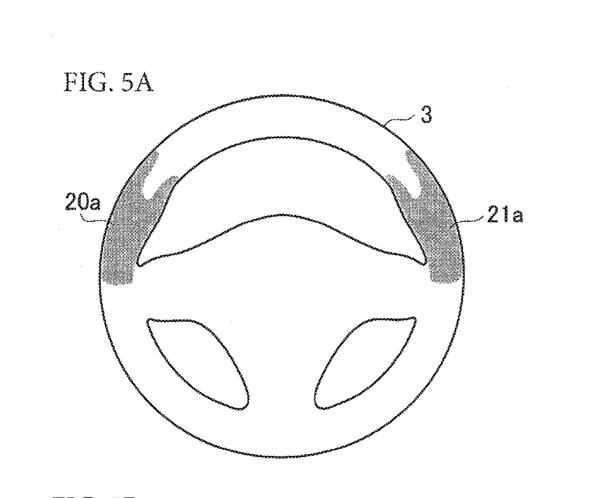
FIGS. 5A-5D are diagrams describing a modification 1 of a light-emitting method of the vehicle information presenting device
Figure 5B:
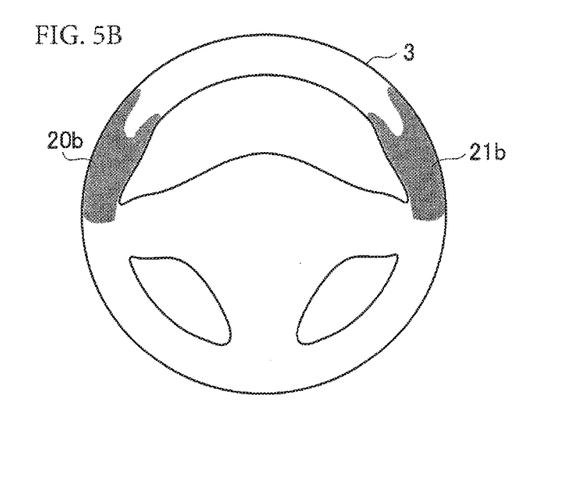
Figure 5C:
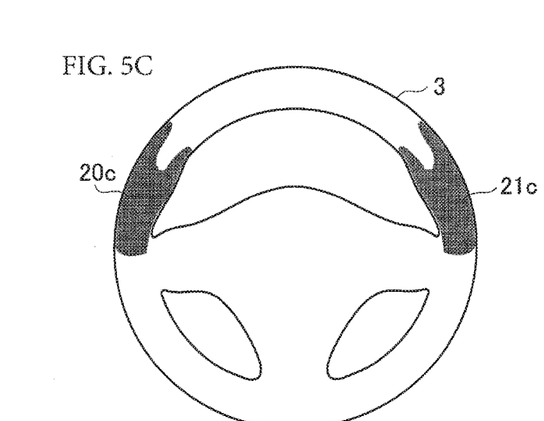
Figure 5D:
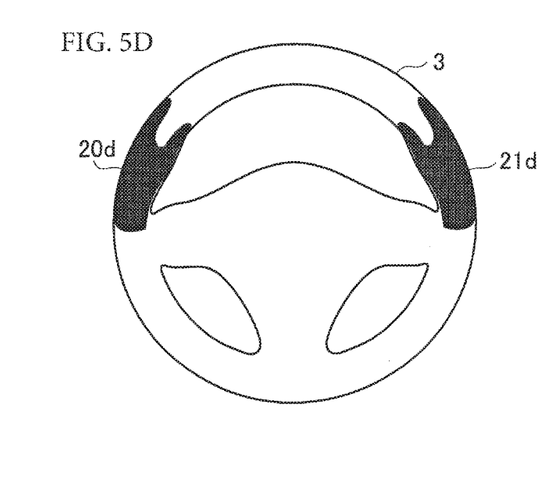

Of FIGS. 4A-4D, FIG. 4A shows an exemplary light-emitting of the LEDs 11 for the notification area, FIG. 4B for the caution (low) area, FIG. 4C for the caution (high) area, and FIG. 4D for the warning area.

When the system state of the automated driving is in the notification area, the automated driving is stable. Thus, as shown in FIG. 4A, the light-emitting controller 4 causes light-emitting regions 20a, 21a (the light-emitting regions are regions formed by the light-emitting of the multiple LEDs 11) that are the gripping positions of the steering wheel 3 to emit light to notifies the driver that the automated driving is stable.

Next, when the system state of the automated driving changes to the caution (low) area, the light-emitting controller 4 causes light-emitting regions 20b, 21b that are larger than the light-emitting regions 20a, 21a to emit light as shown in FIG. 4B. Thereby, the light-emitting controller 4 notifies the driver of the gripping positions of the steering wheel 3 and induces the driver to be prepared and poised to perform the manual driving.

Next, when the system state of the automated driving changes to the caution (high) area, the light-emitting controller 4 causes light-emitting regions 20c, 21c that are larger than the light-emitting regions 20b, 21b to emit light as shown in FIG. 4C. Thereby, the light-emitting controller 4 notifies the driver of the gripping positions of the steering wheel 3 and induces the driver to be prepared and poised to perform the manual driving more strongly than that in the case of the caution (low) area.

Additionally, when the system state of the automated driving changes to the warning area, the light-emitting controller 4 causes light-emitting regions 20d, 21d to emit light such that the gripping positions of the steering wheel 3 are formed in the shapes of hands as shown in FIG. 4D. Thereby, the light-emitting controller 4 notifies the driver of the gripping positions of the steering wheel 3 and warns the driver to switch from the automated driving to the manual driving.

As described above, the vehicle information presenting device of the present embodiment changes light-emitting state of the LEDs 11 in accordance with the system state of the automated driving. Thus, the vehicle information presenting device is able to induce the driver to switch from the automated driving to the manual driving.

In addition, since the vehicle information presenting device of the present embodiment causes the gripping positions of the steering wheel 3 to emit light, it is able to indicate positions to be gripped of the steering wheel 3 to the driver.

Moreover, the vehicle information presenting device of the present embodiment categorizes the system state of the automated driving into multiple areas based on the traveling state of the vehicle and the information on the outside of the vehicle, and causes the gripping positions of the steering wheel 3 to emit light in accordance with the categorized system state. Thus, the vehicle information presenting device is able to indicate the positions to be gripped of the steering wheel 3 to the driver based on the traveling state of the vehicle and the information on the outside of the vehicle.

Further, when the system state of the automated driving changes to the warning area, the vehicle information presenting device of the present embodiment is able to clearly indicate the positions to be gripped of the steering wheel 3 to the driver by forming the light-emitting regions in the shapes of hands. Accordingly, the driver is able to smoothly switch from the automated driving to the manual driving.

Furthermore, the vehicle information presenting device of the present embodiment enlarges the light-emitting regions as the system state of the automated driving changes from the notification area toward the caution (high) area. Accordingly, the driver is able to be prepared and poised to perform the manual driving.

Incidentally, when the system state of the automated driving changes to the warning area, the vehicle information presenting device may sound an alarm, in addition to causing the LEDs 11 to emit light. By doing this, it is possible to call the driver's further attention. In addition, the vehicle information presenting device may cause the LEDs 11 to emit light from the stage where the system state of the automated driving changes to the caution (high) area or the warning area, not causing the LEDs 11 to emit light until the system state of the automated driving changes to the caution (high) area or the warning area.

Next, modifications 1 to 3 of the present embodiment are described with reference to FIGS. 5A-5D to 7A-7D. Each figure, as similar to those of FIGS. 4A-4D, A shows an exemplary light-emitting of the LEDs 11 for the notification area, B for the caution (low) area, C for the caution (high) area, and D for the warning area.

At first, the modification 1 is described with reference to FIGS. 5A-5D. The light-emitting controller 4 causes the light-emitting regions 20a to 20d, 21a to 21d to emit light such that the gripping positions of the steering wheel 3 are formed in the shapes of hands through the four areas, as shown in FIGS. 5A-5D. Then, the light-emitting controller 4 increases brightness of the light-emitting regions as the system state of the automated driving changes from the notification area toward the warning area.

As described above, by changing the brightness of the light-emitting regions in accordance with the system state of the automated driving, the vehicle information presenting device of the modification 1 is able to induce the driver to be prepared and poised to perform the manual driving and clearly indicate the positions to be gripped of the steering wheel 3. This allows the driver to smoothly switch from the automated driving to the manual driving.

Figure 6A:
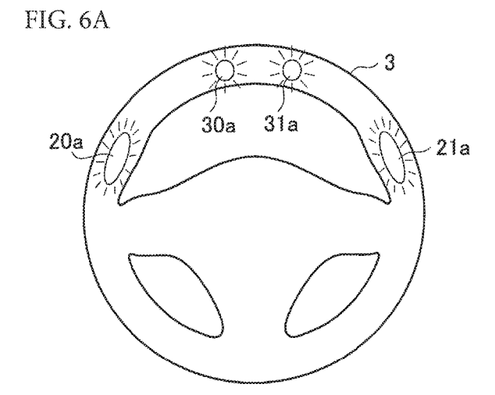
FIGS. 6A-6D are diagrams describing a modification 2 of a light-emitting method of the vehicle information presenting device

Next, the modification 2 is described with reference to FIGS. 6A-6D. When the system state of the automated driving is the notification area, the light-emitting controller 4 causes not only the light-emitting regions 20a, 21a but also light-emitting regions 30a, 31a on upper portions of the steering wheel 3 to emit light, as shown in FIG. 6A. In this case, as for the order of light-emitting, the light-emitting regions 30a, 31a emit the light earlier and the light-emitting regions 20a, 21a emit the light later. Specifically, in the modification 2, the light-emitting controller 4 causes the light-emitting regions to blink as if the light moves on the steering wheel 3. Here, the upper portions of the steering wheel 3 are portions above the gripping position.

Figure 6B:
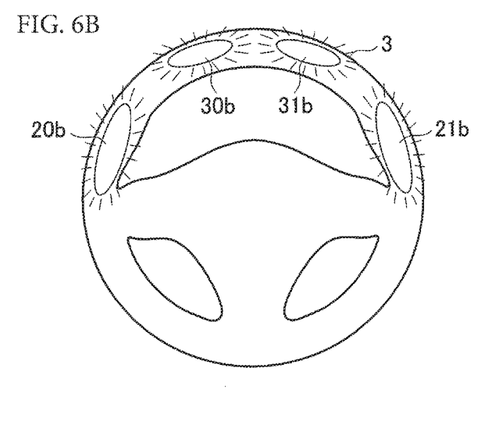

Next, when the system state of the automated driving changes to the caution (low) area, the light-emitting controller 4 causes the light-emitting regions 20b, 21b that are larger than the light-emitting regions 20a, 21a to emit light, and also causes light-emitting regions 30b, 31b that are larger than the light-emitting regions 30a, 31a to emit light, as shown in FIG. 6B. The order of the light-emitting is the same as that in the case of the notification area. In this case, the light-emitting controller 4 makes a time from the light-emitting of the light-emitting regions 30b, 31b to the light-emitting of the light-emitting regions 20b, 21b shorter than a time from the light-emitting of the light-emitting regions 30a, 31a to the light-emitting of the light-emitting regions 20a, 21a. Hereinafter, a time from light-emitting of a light-emitting region to the next light-emitting of another light-emitting region is referred to as a moving time between light-emitting regions.

Figure 6C:
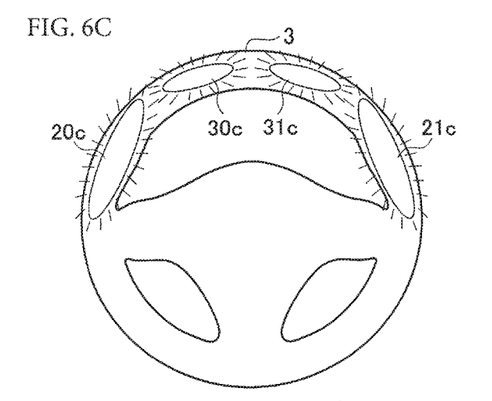

Next, when the system state of the automated driving changes to the caution (high) area, the light-emitting controller 4 causes the light-emitting regions 20c, 21c that are larger than the light-emitting regions 20b, 21b to emit light, and also causes the light-emitting regions 30c, 31c that are larger than the light-emitting regions 30b, 31b to emit light, as shown in FIG. 6C. The order of the light-emitting is the same as that in the case of the notification area. In this case, the light-emitting controller 4 makes the moving time between the light emitting regions shorter than that in the case of the caution (low) area.

Figure 6D:
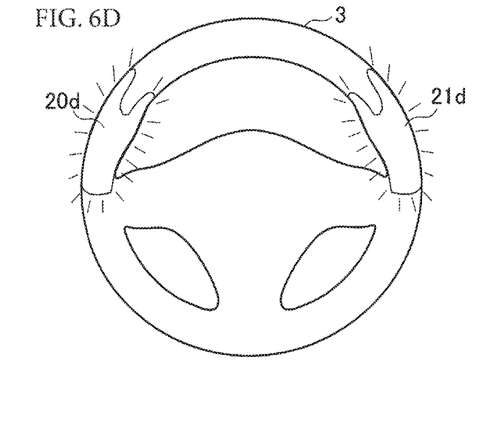

Then, when the system state of the automated driving changes to the warning area, the light-emitting controller 4 causes the light-emitting regions 20d, 21d to emit light such that the gripping positions of the steering wheel 3 are formed in the shapes of hands as shown in FIG. 6D. Thereby, the light-emitting controller 4 notifies the driver of the gripping positions of the steering wheel 3 and calls the driver's attention to switch from the automated driving to the manual driving. In this case, the light-emitting controller 4 may either light or blink the light-emitting regions 20d, 21d. Here, if blinking the light-emitting regions 20d, 21d, the light-emitting controller 4 is able to make a time required for the blinking shorter than the moving time between the light-emitting regions in the case of the caution (high) area.

As described above, the vehicle information presenting device of the modification 2 causes the light-emitting regions to emit light in order from the upper portions to the gripping positions of the steering wheel 3 as if the light moves on the steering wheel 3. Thus, the vehicle information presenting device is able to guide the driver's eyes to the gripping positions of the steering wheel 3.

In addition, the vehicle information presenting device of the modification 2 enlarges the light-emitting regions as the system state of the automated driving changes from the notification area toward the caution (high) area. This makes it possible to induce the driver to be prepared and poised to perform the manual driving.

Moreover, the vehicle information presenting device of the modification 2 shortens the time (the moving time between the light-emitting regions) from the light-emitting of the upper portions of the steering wheel 3 to the light-emitting of the gripping positions thereof as the system state of the automated driving changes from the notification area toward the caution (high) area. This makes it possible to induce the driver to be prepared and poised to perform the manual driving.

Furthermore, when the system state of the automated driving changes to the warning area, the vehicle information presenting device of the modification 2 is able to clearly indicate the positions to be gripped of the steering wheel 3 to the driver by forming the light-emitting regions in the shapes of hands. This makes it possible for the driver to smoothly switch from the automated driving to the manual driving.

Incidentally, although the upper portions of the steering wheel 3 are not caused to emit light in FIG. 6D, light-emitting regions larger than the light-emitting regions 30c, 31c shown in FIG. 6C may be caused to emit light at the upper portions of the steering wheel 3.

Figure 7A:
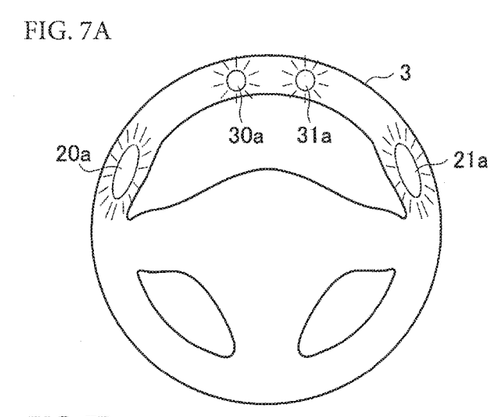
FIGS. 7A-7D are diagrams describing a modification 3 of a light-emitting method of the vehicle information presenting device.

Next, the modification 3 is described with reference to FIGS. 7A-7D. When the system state of the automated driving is in the notification area, the light-emitting controller 4 causes not only the light-emitting regions 20a, 21a but also the light-emitting regions 30a, 31a on the upper portions of the steering wheel 3 to emit light, as shown in FIG. 7A. In this case, as for the order of light-emitting, the light-emitting regions 30a, 31a emit light earlier and the light-emitting regions 20a, 21a emit light later. Specifically, in the modification 3, the light-emitting controller 4 causes the light-emitting regions to blink as if the light moves on the steering wheel 3.

Figure 7B:
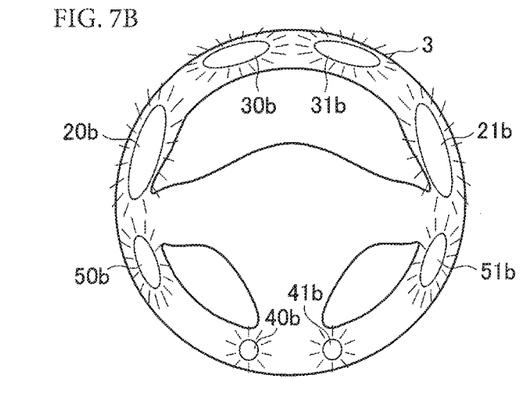

Next, when the system state of the automated driving changes to the caution (low) area, the light-emitting controller 4 causes the light-emitting regions 20b, 21b that are larger than the light-emitting regions 20a, 21a to emit light, and also causes the light-emitting regions 30b, 31b that are larger than the light-emitting regions 30a, 31a to emit light, as shown in FIG. 7B. In addition, the light-emitting controller 4 causes light-emitting regions 40b, 41b and light-emitting regions 50b, 51b that are on lower portions of the steering wheel 3 to emit light. In this case, the order of the light-emitting is (1) the light-emitting regions 30b, 31b, (2) the light-emitting regions 40b, 41b, (3) the light-emitting regions 50b, 51b, (4) the light-emitting regions 20b, 21b. By emitting the light in this order, the light-emitting controller 4 is able to guide the driver's eyes to the gripping positions of the steering wheel 3. In this case, the light-emitting controller 4 makes the moving time between the light emitting regions shorter than that in the case of the notification area. Here, the lower portions of the steering wheel 3 are portions below the gripping position.

Figure 7C:
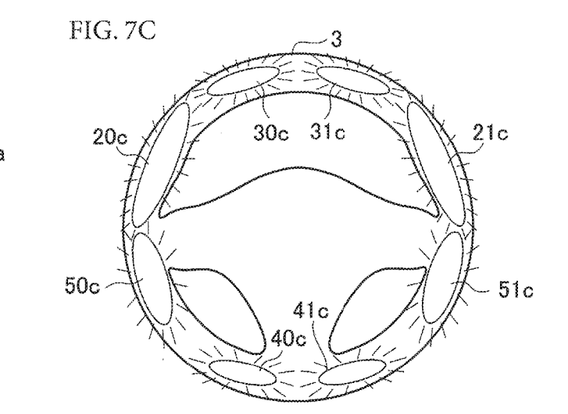

Next, when the system state of the automated driving changes to the caution (high) area, the light-emitting controller 4 causes: the light-emitting regions 20c, 21c that are larger than the light-emitting regions 20b, 21b; the light-emitting regions 30c, 31c that are larger than the light-emitting regions 30b, 31b; light-emitting regions 40c, 41c that are larger than the light-emitting regions 40b, 41b; and light-emitting regions 50c, 51c that are larger than the light-emitting regions 50b, 51b, to emit light, as shown in FIG. 7C. The order of the light-emitting is the same as that in the case of the caution (low) area. In this case, the light-emitting controller 4 makes the moving time between the light-emitting regions shorter than that in the case of the caution (low) area.

Figure 7D:
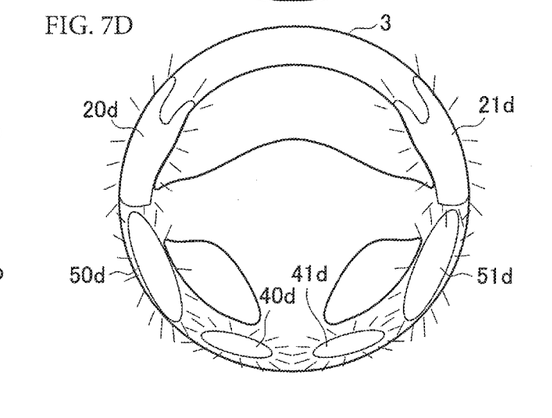

Then, when the system state of the automated driving changes to the warning area, the light-emitting controller 4 causes the light-emitting regions 20d, 21d to emit light such that the gripping positions of the steering wheel 3 are formed in the shapes of hands and also causes light-emitting regions 40d, 41d that are larger than the light-emitting regions 40c, 41c and light-emitting regions 50d, 51d that are larger than the light-emitting regions 50c, 51c to emit light, as shown in FIG. 7D. The order of the light-emitting is (1) the light-emitting regions 40d, 41d, (2) the light-emitting regions 50d, 51d, and (3) the light-emitting regions 20d, 21d. By emitting the light in this order, the light-emitting controller 4 is able to guide the driver's eyes to the gripping positions of the steering wheel 3. In this case, the light-emitting controller 4 makes the moving time between the light emitting regions shorter than that in the case of the caution (high) area.

As described above, the vehicle information presenting device of the modification 3 causes the light-emitting regions to emit light in order from the upper portions to the lower portions and then to the gripping positions of the steering wheel 3, as if the light moves on the steering wheel 3. Thus, the vehicle information presenting device is able to guide the driver's eyes to the gripping positions of the steering wheel 3.

In addition, the vehicle information presenting device of the modification 3 enlarges the light-emitting regions as the system state of the automated driving changes from the notification area toward the warning area. This makes it possible for the driver to be prepared and poised to perform the manual driving.

Moreover, the vehicle information presenting device of the modification 3 shorten the time (the moving time between the light-emitting regions) from the light-emitting of the upper portions or the lower portions of the steering wheel 3 to the light-emitting of the gripping positions of the steering wheel 3 as the system state of the automated driving changes from the notification area toward the warning area. This makes it possible for the driver to be prepared and poised to perform the manual driving.

Furthermore, when the system state of the automated driving changes to the warning area, the vehicle information presenting device of the modification 3 is able to clearly indicate the positions to be gripped of the steering wheel 3 to the driver by forming the light-emitting regions in the shapes of hands. This makes it possible for the driver to smoothly switch from the automated driving to the manual driving.

Incidentally, although the lower portions of the steering wheel 3 are not caused to emit the light in FIG. 7A, light-emitting regions smaller than the light-emitting regions 40b, 41b and the light-emitting regions 50b, 51b shown in FIG. 7B may be caused to emit light at the lower portions of the steering wheel 3. Additionally, although the upper portions of the steering wheel 3 are not caused to emit light in FIG. 7D, light-emitting regions that are larger than the light-emitting regions 30c, 31c shown in FIG. 7C may be caused to emit light at the upper portions of the steering wheel 3.

It should be noted that the above-described embodiment is an exemplary application of the present invention and does not indicate that the technological scope of the present invention is limited to the contents disclosed as the embodiment. In other words, the technological scope of the present invention includes not only the specific techniques disclosed in the above-described embodiment but also includes various modifications, changes, alternative techniques, and the like that may be easily derived from this disclosure. For example, the brightness of the light-emitting regions may be changed in addition to the size change of the light-emitting regions as shown in FIGS. 4A-4D, 6A-6D, and 7A-7D. In addition, the light-emitting regions may blink in the cases of FIGS. 4A-4D and 5A-5D, and a blink rate may also be changed in accordance with the system state of the automated driving. Specifically, the vehicle information presenting device is able to make the blink rate of the light-emitting regions faster as the system state of the automated driving becomes more unstable. In such manner of the light-emitting, the vehicle information presenting device is able to call the driver's further attention.

Moreover, the colors of the LEDs 11 may be changed so as to change the colors of the light-emitting regions, for example, from blue to green, then to yellow, and then to red as the system state of the automated driving changes from the notification area to the caution (low) area, from the caution (low) area to the caution (high) area, and from the caution (high) area to the warning area. In such manner of the light-emitting, the vehicle information presenting device is able to make a contrast between the areas and call the driver's further attention.

Further, in the vehicle information presenting device shown in FIGS. 4 to 7, the light-emitting regions and the regions in which the LEDs 11 are arranged but which excludes the light emitting regions may be inverted. In such manner of the light-emitting, the vehicle information presenting device is able to make a contrast between the regions and call the driver's further attention.

Figure 8:
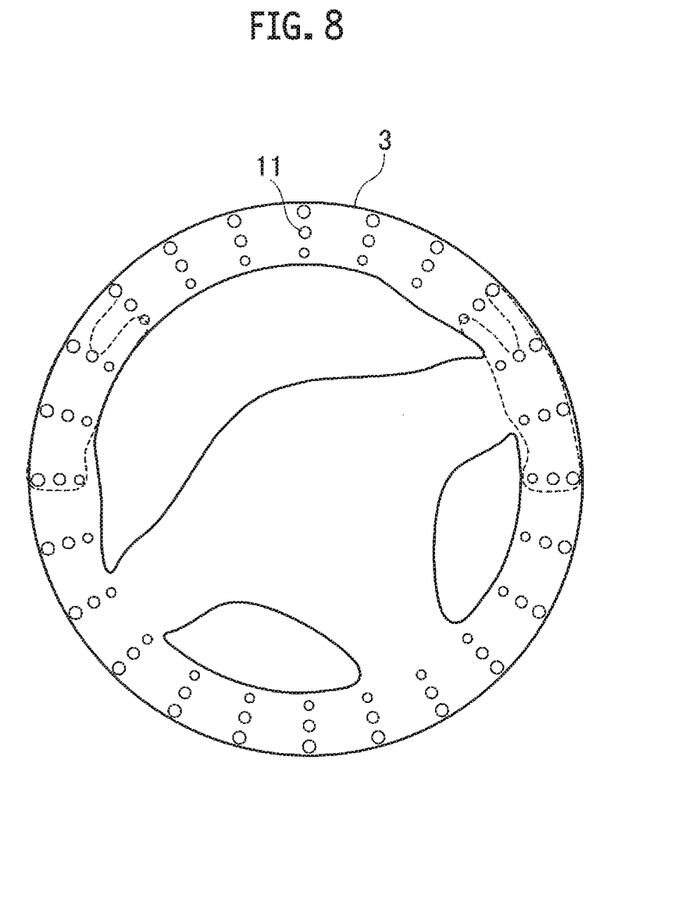
FIG. 8 is a schematic diagram of the vehicle information presenting device.

Furthermore, as shown in FIG. 8, the LEDs 11 may be equally disposed in three lines in the wheel portion of the steering wheel 3 and each interval between the LEDs 11 adjacent to each other in a circumferential direction may be shorter than or equal to the length of a finger. With this, the vehicle information presenting device is able to form the light-emitting in the shapes of hands at any position of the steering wheel 3 as indicated by dotted lines in FIG. 8 even in a case where the steering wheel 3 turns by the automated driving. In this case, to prevent the driver from taking an unnatural posture, the vehicle information presenting device causes the gripping positions that are appropriate for the manual driving operation to emit light. This prevents an adverse effect on the driver's operation even when switching from the automated driving to the manual driving.

REFERENCE SIGNS LIST

3 steering wheel
4 light-emitting controller (light-emitting control unit)
11 LED (light-emitting unit)
20a to 20d, 21a to 21d, 30a to 30c, 31a to 31c, 40b to 40d, 41b to 41d, 50b to 50d, 51b to 51d light-emitting region

The invention claimed is:

1. A vehicle information presenting device used for an automated driving vehicle that automatically performs traveling control of the vehicle based on a traveling state of the vehicle and information on an outside of the vehicle, comprising:
a steering wheel;
a light-emitting unit that is disposed in the steering wheel and emits light; and
a light-emitting control unit that causes the light-emitting unit to emit light, wherein
the light-emitting control unit changes a light-emitting state of the light-emitting unit to induce a driver to switch from automated driving to manual driving in accordance with a system state of the automated driving, and causes each of gripping positions separated on left and right of an upper side of the steering wheel to emit light for indicating positions of the steering wheel to be gripped with left and right hands to the driver, and
the light-emitting control unit does not cause an upper portion of the gripping positions to emit light,
wherein when the steering wheel is turned by the automated driving, the light-emitting control unit causes the gripping positions that are appropriate for a manual driving operation to emit light.

2. The vehicle information presenting device according to claim 1, wherein the light-emitting control unit categorizes the system state into areas and causes the light-emitting unit to emit light in accordance with a categorized system state.

3. The vehicle information presenting device according to claim 1, wherein the light-emitting control unit causes the light-emitting unit to emit light such that the light-emitting of the light-emitting unit is formed in a shape of a hand.

4. The vehicle information presenting device according to claim 1, wherein the light-emitting control unit enlarges a light-emitting region of the light-emitting unit as the system state becomes more unstable, and causes the light-emitting unit to emit light such that the light-emitting of the light-emitting unit is formed in a shape of a hand when the system state is categorized as a most unstable area.

5. The vehicle information presenting device according to claim 1, wherein the light-emitting control unit changes at least one of brightness and a color of the light in accordance with the system state.

6. The vehicle information presenting device according to claim 1, wherein the light-emitting control unit alternates light-emitting regions of the steering wheel.

\* \* \* \* \*